United States Patent Office 3,226,364
Patented Dec. 28, 1965

3,226,364
TWO-PART CATALYST SYSTEM IN PROCESS FOR PREPARING ONE STAGE PHENOLIC RESINS
Frank Stanton O'Connell, Holyoke, Mass., assignor to Monsanto Company, a corporation of Delaware
No Drawing. Filed June 21, 1961, Ser. No. 118,538
6 Claims. (Cl. 260—57)

This invention relates to liquid phenolic resins and more particularly relates to an improved method of preparing liquid one-stage phenolic resins.

Prior art processes for preparing liquid one-stage phenolic resins have been characterized by one or more of the following deficiencies: (1) the reaction is too slow, (2) the products are slow-curing, (3) uneconomical catalyst levels are required, (4) the liquid products have unduly high ash contents which contribute poor color and have a detrimental effect on the moisture resistance, chemical resistance, and electrical properties of the cured resins, or (5) the water-dilutability of the liquid products is deleteriously affected by steps taken to avoid one of the foregoing deficiencies. Deficiencies 1–3, of course, tend to make a process economically unattractive when practiced on a commercial scale; deficiencies 4 and 5 lead to inferior products.

An object of this invention is to provide a novel process for preparing liquid one-stage phenolic resins.

Another object is to provide an economically attractive process for preparing liquid one-stage phenolic resins having a low ash content.

These and other objects are attained by reacting a molar excess of an aldehyde with a phenol at a pH of 7.0–11.5 and a temperature of 20–100° C. to form a liquid, water-dilutable resin, the reaction being catalyzed by a mixture of 0.012–0.25 mol of an inorganic base and 0.005–0.25 mol of an organic base per mol of the phenol.

The following examples are given to illustrate the invention. Quantities are mentioned on a weight basis.

*Example I.—Part A*

A suitable reaction vessel is charged with 100 parts of phenol and 142 parts of formalin (37% formaldehyde), followed by the addition of 2.33 parts of triethylamine and a solution of 1.0 part of flake caustic in an equal amount of water. The reaction mixture is refluxed at 70° C. to a free formaldehyde content of 3.0% and cooled, after which 1.7 parts of 75% phosphoric acid are added. The resin is then dehydrated to 60% solids, cooled to less than 10° C., and filtered to remove insoluble inorganic salt. The product is a liquid phenolic resin having an ash content of 0.115%.

*Part B*

Part A is repeated with the exception that caustic is used as the sole catalyst instead of as a co-catalyst with triethylamine. Two resin-impregnated sheets having a resin content of about 50% are prepared by impregnating bleached kraft paper sheets with the resins of Part A and Part B, and each of the sheets is directly laminated to a plywood panel. Determination of the surface moisture-absorption properties of the panels shows that the resin of Part A absorbs only 1.52 g./sq. ft./24 hours' exposure, whereas the resin of Part B absorbs 3.94 g./sq. ft./24 hours' exposure.

Exposure of surfaces of samples of the same panels to 1% caustic solution shows that less discoloration and surface deterioration is encountered with the resin of Part A.

*Example II.—Part A*

A suitable reaction vessel is charged with 100 parts of phenol and 215 parts of formalin (37% formaldehyde), followed by the addition of 3 parts of triethylamine and a solution of 2 parts of sodium hydroxide in an equal amount of water. The reaction mixture is refluxed at 70° C. to a free formaldehyde content of 4.3% and cooled, after which 3.27 parts of 75% phosphoric acid are added. The resin is then dehydrated to 65% solids, cooled to less than 10° C., and filtered to remove insoluble inorganic salt. The product is a liquid phenolic resin having an ash content of 0.182%.

*Part B*

Part A is repeated with the exception that triethylamine is used as the sole catalyst instead of as a co-catalyst with sodium hydroxide. The formaldehyde consumption is considerably slower than in Part A, and a final level of 5.5% free formaldehyde is obtained in a comparable reaction time. The liquid resin product is slower curing, as shown by a 150° C. hot plate cure of 189 seconds for this resin vs. 78 seconds for the resin of Part A.

*Example III*

A suitable reaction vessel is charged with 100 parts of phenol and 142 parts of formalin (37% formaldehyde), followed by the addition of 2.33 parts of triethylamine and 1.75 parts of lithium hydroxide monohydrate. The reaction mixture is refluxed at 70° C. to a free formaldehyde content of 1.5% and cooled, after which 1.93 parts of 75% phosphoric acid are added. The resin is then dehydrated to 70% solids, cooled to less than 10° C., and filtered to remove insoluble salt. The product is a liquid phenolic resin having an ash content of 0.135%.

*Example IV*

A suitable reaction vessel is charged with 100 parts of phenol and 142 parts of formalin (37% formaldehyde), followed by the addition of 34 parts of a 10% solution of tetraethylammonium hydroxide in water and 2 parts of a 50% solution of sodium hydroxide in water. The reaction mixture is refluxed at 70° C. to a free formaldehyde content of 3.0% and cooled, after which 1.7 parts of 75% phosphoric acid are added. The resin is then dehydrated to 60% solids, cooled to less than 10° C., and filtered to remove insoluble inorganic salt. The product is a liquid phenolic resin having an ash content of 0.120%.

*Example V*

A suitable reaction vessel is charged with 100 parts of phenol and 125 parts of formalin (37% formaldehyde), followed by the addition of 2.5 parts of triethanolamine and a solution of 3.7 parts of flake caustic in an equal amount of water. The reaction mixture is refluxed at 85° C. to a free formaldehyde content of 1.2% and cooled, after which 6.1 parts of 75% phosphoric acid are added. The resin is then dehydrated to a solids content of 85%, sufficient alcohol is added to bring the solids content down to 64%, and the resin is then cooled and filtered to remove insoluble inorganic salt. The product is a liquid phenolic resin having an ash content of 0.164%.

The preceding examples show that the process of the invention results in the formation of liquid phenolic resins having ash contents lower than the ash contents of prior art resins, except for those prior art resins which have been prepared by economically unattractive processes or have been after-treated by an ion-exchange process. The following example demonstrates the utility of the invention in preparing resins which are not partially neutralized and filtered to remove insoluble inorganic salt and yet have ash contents as low as the ash contents of comparable neutralized, filtered resins of the prior art. These unneutralized resins have the advantage of faster curing rate.

Example VI

A suitable reaction vessel is charged with 100 parts of phenol and 172 parts of formalin (37% formaldehyde), followed by the addition of 2.5 parts of triethylamine and a solution of 0.7 part of sodium hydroxide in an equal amount of water. The reaction mixture is refluxed at 65° C. to a free formaldehyde content of 3.2% and cooled. The product is a water-dilutable resin having an ash content of 0.540%.

The process of the invention is a method of preparing liquid one-stage phenolic resins by reacting a molar excess of an aldehyde with a phenol at a pH of 7.0–11.5 and a temperature of 20–100° C. to form a liquid, water-dilutable resin, the reaction being catalyzed by a mixture of 0.012–0.25 mol of an inorganic base and 0.005–0.25 mol of an organic base per mol of the phenol.

Although the specific examples have been directed to phenol-formaldehyde resins because of their greater commercial significance, the invention is also obviously applicable to the preparation of other liquid phenol-aldehyde resins. Phenols utilizable in the practice of the invention include phenol, cresols, xylenols, resorcinol, hydroquinone, etc., and mixtures thereof; examples of aldehydes which can be used are formaldehyde, acetaldehyde, propionaldehyde, benzaldehyde, furfural, paraform, paraldehyde, etc. The reaction mixture, as is customary in the preparation of one-stage phenolic resins, contains a molar excess of the aldehyde, usually about 1.2–3.0 mols of the aldehyde per mol of the phenol.

The inorganic base which constitutes one component of the catalyst mixture is suitably an oxide, hydroxide, or carbonate of an alkali metal or alkaline earth metal, e.g., sodium hydroxide, potassium hydroxide, lithium hydroxide, calcium hydroxide, lithium oxide, sodium carbonate, lithium carbonate, etc. Preferably, this component is an alkali metal hydroxide or carbonate. The amount of inorganic base used is in the range of 0.012–0.25 mol per mol of phenol in the reaction mixture and should not exceed 0.04 mol per mol of phenol when an acid is not going to be added to the liquid resin to convert the inorganic base to an insoluble, filterable salt.

The other component of the catalyst mixture is an organic base which is used in amounts in the range of 0.005–0.25 mol per mol of phenol in the reaction mixture. Suitable organic bases include primary, secondary, and tertiary aliphatic amines, e.g., mono-, di-, and tri-methyl, -ethyl, -propyl amines and the like; alkanol amines, e.g., ethanolamine, dibutanolamine, triethanolamine, etc.; alkyl alkanol amines such as methyl diethanolamine; alkyl-substituted ammonium hydroxides such as tetraethylammonium hydroxide, etc. The preferred organic bases for use in the practice of the invention are trialkylamines, trialkanolamines, and tetraalkylammonium hydroxides; of these preferred bases, trialkylamines are most preferred.

With the exception of the use of the novel catalyst mixture of the invention, the process is conducted under conditions conventionally observed in the preparation of liquid one-stage phenolic resins, i.e., the reaction mixture is maintained at a pH of 7.0–11.5 and a temperature of 20–100° C. until a liquid resin having the desired water-dilutability is formed, the extent of water-dilutability being dependent on the time and temperature of the reaction. It is frequently desirable to add to the liquid resin an acid, such as phosphoric acid, oxalic acid, etc. which is capable of converting the inorganic base component of the catalyst to an insoluble salt and then to filter out this insoluble salt in order to minimize the ash content of the resin. When this neutralization step is included, it can be performed before or after dehydration of the resin.

The liquid resins are usually at least partially dehydrated before being used as impregnants, coating materials, molding materials, etc., in which applications they are cured by heating at elevated temperatures. Depending on the particular application in which they are to be used, they may be employed as partially dehydrated aqueous solutions, as varnishes formed by adding organic solvents to the partially or completely dehydrated liquid resins, or as lump resins formed by substantially completely dehydrating the liquid resins.

The particular advantage of the invention is in its provision of an economical means of preparing liquid one-stage phenolic resins having a low ash content. Prior art processes for preparing liquid one-stage phenolic resins either were uneconomical on a commercial scale or led to the formation of resins which, even after neutralization and filtration, had ash contents of about 0.5–2.0%.

It is obvious that many variations may be made in the products and processes set forth above without departing from the spirit and scope of this invention.

What is claimed is:

1. In a process for preparing liquid, water-dilutable phenolic resins consisting of reacting a mixture consisting of a molar excess of an aldehyde with a phenol at a pH of 7.0–11.5 and a temperature of 20–100° C., the improvement which comprises conducting the reaction in the presence of a catalyst mixture consisting of 0.012–0.25 mol of an inorganic base and 0.005–0.25 mol of an organic base per mol of the phenol; said inorganic base being selected from the group consisting of alkali metal and alkaline earth metal carbonates, hydroxides, and oxides; said organic base being selected from the group consisting of primary, secondary and tertiary aliphatic amines.

2. In a process for preparing liquid, water-dilutable phenolic resins consisting of refluxing a mixture consisting of 1.2–3.0 molar proportions of formaldehyde and 1 molar proportion of phenol at a pH of 7.0–11.5 and a temperature of about 65–85° C., the improvement which comprises conducting the reaction in the presence of a catalyst mixture consisting of 0.012–0.25 mol of an inorganic base and 0.005–0.25 mol of an organic base per mol of phenol; said inorganic base being selected from the group consisting of alkali metal and alkaline earth metal carbonates, hydroxides, and oxides; said organic base being selected from the group consisting of primary, secondary and tertiary aliphatic amines.

3. A process as in claim 2 wherein the inorganic base is an alkali metal hydroxide.

4. A process as in claim 2 wherein the organic base is triethylamine.

5. A process as in claim 2 wherein the organic base is triethanolamine.

6. A process as in claim 2 wherein the organic base is tetraethylammonium hydroxide.

References Cited by the Examiner

UNITED STATES PATENTS

| | | | |
|---|---|---|---|
| 1,873,575 | 8/1932 | Greenwald | 260—57 X |
| 1,994,753 | 3/1935 | Cherry | 260—57 |

FOREIGN PATENTS

| | | |
|---|---|---|
| 302,609 | 7/1927 | Great Britain. |
| 614,037 | 12/1948 | Great Britain. |

WILLIAM H. SHORT, *Primary Examiner.*

P. E. MANGAN, *Examiner.*